(12) United States Patent  
Ijuin et al.

(10) Patent No.: US 9,453,776 B2
(45) Date of Patent: Sep. 27, 2016

(54) INTERNAL PRESSURE INSPECTION APPARATUS AND METHOD FOR A SEALED CONTAINER

(75) Inventors: Taichi Ijuin, Sagamihara (JP); Norihiko Ozaku, Sagamihara (JP); Tetsuya Takatomi, Shizuoka (JP)

(73) Assignee: DAIWA CAN COMPANY, Tokyo (JP)

( * ) Notice: Subject to any disclaimer, the term of this patent is extended or adjusted under 35 U.S.C. 154(b) by 178 days.

(21) Appl. No.: 14/350,704

(22) PCT Filed: May 31, 2012

(86) PCT No.: PCT/JP2012/064110
§ 371 (c)(1),
(2), (4) Date: Apr. 9, 2014

(87) PCT Pub. No.: WO2013/061645
PCT Pub. Date: May 2, 2013

(65) Prior Publication Data
US 2014/0251018 A1 Sep. 11, 2014

(30) Foreign Application Priority Data

Oct. 28, 2011 (JP) .................................. 2011-236610

(51) Int. Cl.
*G01L 11/02* (2006.01)
*G01M 3/36* (2006.01)
(Continued)

(52) U.S. Cl.
CPC ............... *G01L 11/02* (2013.01); *G01M 3/36* (2013.01); *G01M 3/38* (2013.01); *G01L 19/0007* (2013.01); *G01L 19/0092* (2013.01)

(58) Field of Classification Search
CPC ........... G01L 19/0007; G01L 19/0092; G01L 27/00; G01L 11/02; G01M 3/36; G01M 3/38

USPC ....................................... 73/714, 700; 359/3
See application file for complete search history.

(56) References Cited

U.S. PATENT DOCUMENTS 4,744,076 A 5/1988 Elias
5,193,014 A * 3/1993 Takenouchi ......... B65D 79/005
359/1
2010/0318317 A1 12/2010 Suzuki

FOREIGN PATENT DOCUMENTS

JP 63 67845 3/1988
JP 6367845 B * 12/1988
(Continued)

OTHER PUBLICATIONS

Translation of Abstract for JP 6367845 B.*
(Continued)

*Primary Examiner* — Lisa Caputo
*Assistant Examiner* — Nathaniel T Woodward
(74) *Attorney, Agent, or Firm* — Oblon, McClelland, Maier & Neustadt, L.L.P

(57) ABSTRACT

An internal pressure inspection apparatus for a sealed container having a can lid that is attached to any of an upper end and a lower end of a can trunk, and that is deformed by an internal pressure of the container. A laser sensor adapted to measure a distance from the can lid by irradiating the can lid is situated parallel to the can lid while being allowed to move relative to the can lid. The inspection apparatus integrates relative displacement values between a reference point closer to a center of the can lid than a seamed portion and other points closer to a center of the can lid than the reference point, and acceptability of the internal pressure is judged based on the value of integration.

11 Claims, 3 Drawing Sheets

(51) Int. Cl.
*G01M 3/38* (2006.01)
*G01L 19/00* (2006.01)

(56) References Cited

FOREIGN PATENT DOCUMENTS

| JP | 3 167413 | 7/1991 |
| JP | 6 213748 | 8/1994 |
| JP | 8 219915 | 8/1996 |
| JP | 9 210835 | 8/1997 |
| JP | 9210835 A * | 8/1997 |
| JP | 2002 148133 | 5/2002 |
| JP | 2007 192646 | 8/2007 |
| JP | 2007192646 A * | 8/2007 |
| JP | 2009 210451 | 9/2009 |

OTHER PUBLICATIONS

International Search Report Issued Jul. 3, 2012 in PCT/JP12/064110 Filed May 31, 2012.

* cited by examiner (a)

Relation between Internal Pressure and Area (b)

Relation between Internal Pressure and Displacement

INTERNAL PRESSURE INSPECTION APPARATUS AND METHOD FOR A SEALED CONTAINER

TECHNICAL FIELD

This invention relates to a method and apparatus for inspecting an internal pressure of a sealed container such as of a three-piece can or a bottle-shaped can, and especially to an apparatus and method for inspecting an internal pressure of a metal can.

BACKGROUND ART

Basically, a container is sealed air-tightly after food or drink is filled therein. If a pinhole or a seaming defect exists in the container, or if the content is deteriorated, a vacuum down and a pressure drop may be caused by an intrusion of air or generation of gas, or by a leakage of an infill gas. In order to avoid such disadvantage, the internal pressure of sealed container filled with the contents has been inspected to pick up defective products from a manufacturing line. To this end, as disclosed in Japanese Patent Laid-Opens Nos. 63-67845, 06-213748, and 2002-14813, an inspection of abnormality of the pressure in the sealed container has been carried out by tapping the sealed container and analyzing frequency of the resultant sound or vibrations.

In recent days, canned products containing solid materials or high viscosity content such as corn soup have been available in the market. In the canned product of this kind, the contents or solid materials thereof are likely to adhere to an inner surface of (a sailing or bottom lid of) the container to be tapped unevenly and irregularly. That is, frequency or distribution of the sound or vibration caused by such a tapping inspection may be varied depending on the condition of the can lid. Consequently, the canned product the internal pressure thereof is normal may be judged as a defective product erroneously.

In order to avoid such a disadvantage, an inspecting method or apparatus for inspecting a deformation of the container caused by the internal pressure has been proposed. For example, Japanese Patent Laid-Open No. 8-219915 discloses an equipment for inspecting an internal pressure of a can. The equipment taught by Japanese Patent Laid-Open No. 8-219915 is comprised of an eddy current type distance sensors situated above conveyer for conveying the cans packed in a box. The distance sensor is adapted to measure one point in the center of the cover and two points on the seeming part of the can in the box being conveyed on a conveyor. According to the teachings of Japanese Patent Laid-Open No. 8-219915, the deformation of the center of the cover is calculated based on the measured value, and the internal pressure of the can is inspected by comparing the deformation with a reference value. Meanwhile, Japanese Patent Laid-Open No. 2009-210451 discloses an apparatus for inspecting a can carried in a carton case on a conveyer. The apparatus is adapted to measure a top depth from the upper end of the can to the open tab, and a bottom depth from the lower end of the can to the bottom panel. A total value of those depths is compared with a reference value to determine the internal pressure of the can.

DISCLOSURE OF THE INVENTION

Both of the equipment taught by Japanese Patent Laid-Open No. 8-219915 and the apparatus taught by Japanese Patent Laid-Open No. 2009-210451 are adapted to inspect the internal pressure based on a change in shape of the sealed container. Therefore, the internal pressure can be inspected irrespective of a type of the content. According to the teachings of Japanese Patent Laid-Open No. 8-219915, however, an average distance between the seaming part and the sensor is calculated, and a difference between the calculated average distance and the distance from the center point of the cover to the sensor is employed as the deformation value. Therefore, a measuring accuracy of the deformation may be insufficient and a threshold value for judging the internal pressure has to be set to a small value. Consequently, some of the cans may be judged as a defective can even if the internal pressure thereof is normal. That is, provided that a portion of the can lid away from the center is deformed significantly depending on a shape or a surface processing, the central portion of the can lid would be deformed most significantly but an actual deformation in comparison with its original shape is rather small. Therefore, the threshold value for judging the internal pressure has to be set to a small value.

According to Japanese Patent Laid-Open No. 2009-210451, on the other hand, the sensors are arranged both above and under the can to measure the top depth and bottom depth. That is, a cost for the apparatus is rather expensive. In addition, the sensor for measuring the bottom depth of the can has to be installed in the conveyer to inspect the internal pressure of the can being conveyed. That is, if the internal pressure inspecting apparatus of this kind is applied to the existing system, it is necessary to entirely modify the system including the conveyer, and as a result, a structure of the facility would be complicated. Thus, it is rather difficult to apply the inspecting apparatus of this kind to the existing system.

In addition, both of the equipment taught by Japanese Patent Laid-Open No. 8-219915 and the apparatus taught by Japanese Patent Laid-Open No. 2009-210451 use the eddy current sensor to measure the distance. Therefore, It is difficult to improve the accuracy of measuring the distance and internal pressure. As described, the equipment taught by the Japanese Patent Laid-Open No. 8-219915 is adapted to measure the distance between the upper end of the seaming part and the sensor. However, a width of the upper end is rather narrow that is, a projection area form above is rather small. Therefore, an area of certain extent is required for the eddy current sensor to measure a distance (or interval) by generating an eddy current. Therefore, it is difficult for the eddy current sensor to measure a position of the seaming part accurately thereby deteriorating the inspection accuracy of the internal pressure of the can. Meanwhile, according to the teachings of Japanese Patent Laid-Open No. 08-219915, the deformation of the center of the cover is measured by measuring three points, i.e., the center point of the cover and other two points of both sides of the center point. However, the center of the cover and the other two points are deformed in the same direction. Therefore, the inspection accuracy of the internal pressure may be insufficient.

The present invention has been conceived noting the foregoing technical disadvantages, and its object is to provide an apparatus and method for inspecting internal pressure of a sealed container accurately and easily utilizing a deformation of a sealed container.

The internal pressure inspection apparatus of the present invention is used to inspect a sealed container having a can lid that is attached to any of an upper end and a lower end of a can trunk, and that is deformed by an internal pressure of the container. In order to achieve the above-mentioned object, according to the present invention, the internal pressure inspection apparatus of the present invention is comprised of: a laser displacement sensor, that is situated in a plane parallel to the bottom lid while being allowed to move relatively with the can lid, and that is adapted to measure a distance from the can lid by irradiating the can lid with a laser beam; a displacement value integration means that integrates relative displacement values of the can lid; and a judging means that judges acceptability of the internal pressure based on the value integrated by the displacement value integration means. Specifically, the displacement value integration means is configured to integrate relative displacement values between: a reference point, at which a distance from the laser displacement sensor is the shortest or longest, and which is situated closer to a center of the can lid than a seamed portion where the can lid is attached to the can trunk; and other points of closer to a center of the can lid than the reference point According to the present invention, the other points include a plurality of points on a diametrical line of the bottom lid comprising a center point of the can lid.

Specifically, the can lid is comprised of: an annular groove formed by inwardly depressing in an inner circumferential side of the seamed portion, an outer edge connected with an inclined inner wall of the annular groove, and a panel portion formed within an inner circumferential side of the outer edge. In addition, the reference point includes the outer edge, and the other points include a plurality of points on the panel portion.

According to the present invention, a total number of the reference point and the other points is 700 or larger.

According to another aspect of the present invention, there is provided an internal pressure inspection method. The inspection method of the present invention is also applied to the sealed container having a can lid that is attached to any of an upper end and a lower end of a can trunk, and that is deformed by an internal pressure of the container. The internal pressure inspection method of the present invention is characterized by comprising: measuring relative displacement values of a plurality of points of the can lid closer to a center of the can lid than a seamed portion where the can lid is attached to the can trunk by a laser displacement sensor; integrating the relative displacement values; and judging acceptability of the internal pressure based on the value of integral.

According to the inspection method of the present invention, the displacement values are measured at a plurality of points on a diametrical line of the bottom lid comprising a center point of the can lid.

As described, the inspection method of the present invention is also applied to the sealed container having a can lid comprised of an annular groove formed by inwardly depressing in an inner circumferential side of the seamed portion, an outer edge connected with an inclined inner wall of the annular groove, and a panel portion formed within an inner circumferential side of the outer edge. The inspection method of the present invention is configured to measure the relative displacement values of a plurality of points on the panel portion in comparison with the outer edge.

In addition, the inspection method of the present invention is configured to measure the relative displacement values at 700 points or larger.

Thus, according to the inspection apparatus and method, the displacement values of the can lid is measured using the laser displacement sensor at a plurality of points of the inner circumferential side of the seamed portion at which the can lid is attached to the can trunk. Therefore, the deformations of the can lid can be measured accurately even if the deformation is rather small. Since the displacement values are thus measured at the points of the inner circumferential side of the seamed portion, the relative displacement values can be measured accurately even if the container is conveyed while inclined so that the can lid is inclined with respect to the displacement sensor. In addition, according to the present invention, the displacement values are integrated. Therefore, even if the deformation of the can lid is rather small at the individual point in comparison with the normal shape, a change in the entire shape of the can lid can be detected certainly by thus integrating the deformation values. For this reason, a larger threshold value may be used for judging the acceptability of the internal pressure of the container so that judgment errors of the internal pressure can be reduced. For example, even if a deformation of the central portion of the can lid is small but the can lid is deformed around the central portion of the can lid by a change in the internal pressure of the container, the measurement of the deformation of the can lid takes place even at the portion around the central portion. Therefore, abnormality of the internal pressure can be detected certainly. Further, since the internal pressure is inspected by calculating the data detected by the displacement sensor, the structure of the apparatus can be simplified so that it is easy to apply the apparatus to the existing facilities.

As described, according to the present invention, the relative displacement values are measured at the plurality of points along the diametrical line of the can lid. That is, the acceptability of the internal pressure is judged based on the data including the data about the central portion of the can lid which is deformed most significantly. Therefore, the acceptability of the internal pressure of the container can be inspected certainly and accurately.

BEST MODE FOR CARRYING OUT THE INVENTION

Hereinafter, the internal pressure inspection apparatus according to the present invention will be explained in more detail. The internal pressure inspection apparatus is adapted to inspect a sealed container in which a can trunk holding the content is closed air-tightly by a can lid. For example, such sealed container includes a three-piece type container in which the can trunk is closed by an upper lid and a bottom lid, a two-piece type container in which a bottomed can trunk is closed by an upper lid, and bottle type can in which a threaded neck portion formed on an upper end of the can trunk is closed by a cap and a lower opening of the can trunk is closed by a bottom lid. Although the material of the container is not especially limited to specific material, the internal pressure inspection apparatus of the present invention is suitable to inspect the container made of metal material such as aluminum, aluminum alloy, steel and so on. In addition, the internal pressure inspection apparatus of the present invention is adapted to inspect both containers in which the internal pressure is lower than the atmospheric pressure, and in which the internal pressure is higher than the atmospheric pressure.

Figure 1:
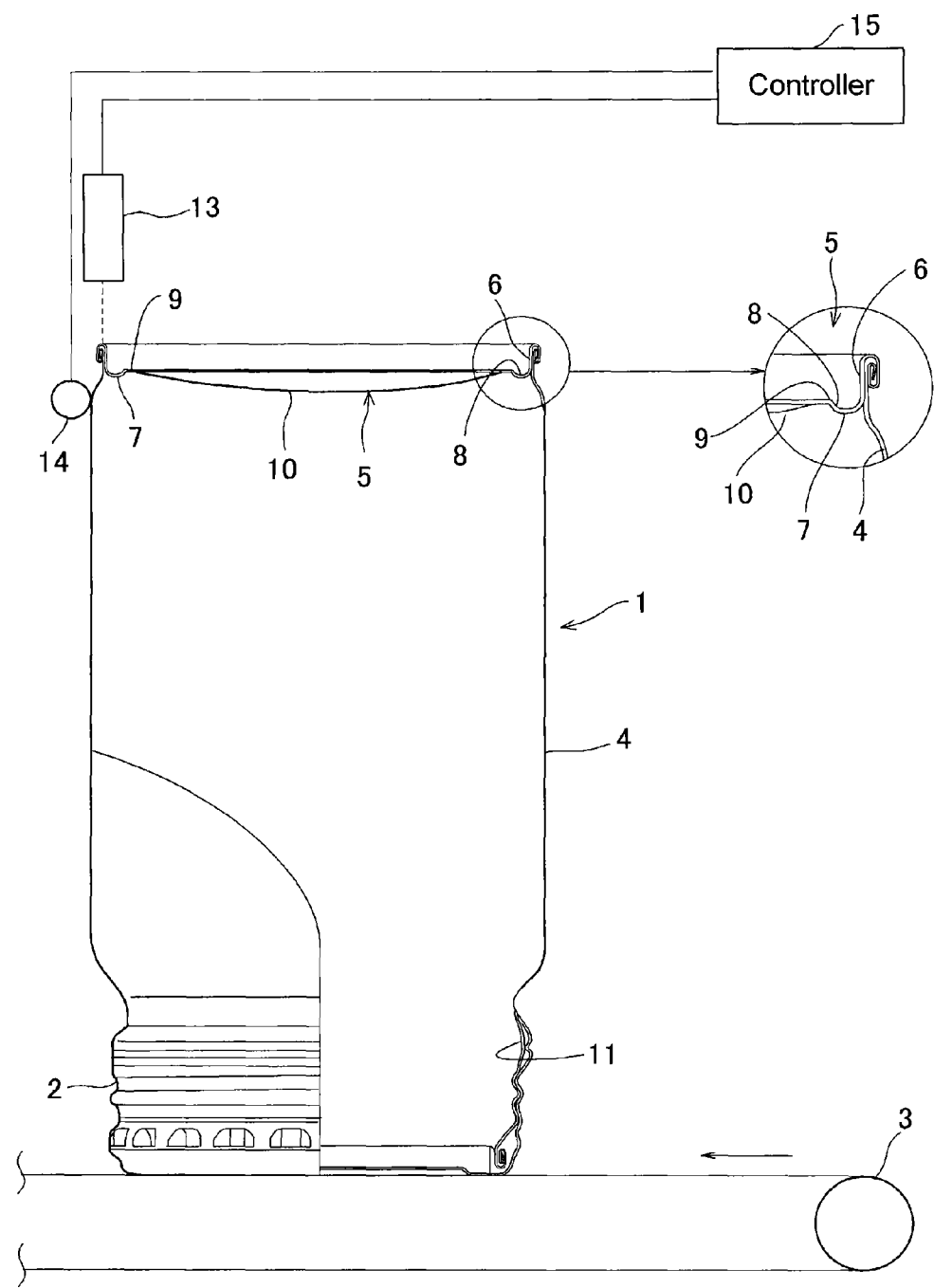
FIG. 1 is a view schematically showing one example of the internal pressure inspection apparatus according to the present invention.

FIG. 1 shows a preferred example for inspecting a bottle can 1 to detect an internal pressure thereof. According to the preferred example shown therein, the bottle can 1 is erected on a conveyer 3 in an inverted manner so that a cap 2 is situated on the downside, and the internal pressure of the bottle can 1 is detected while conveying the bottle can 1 on the conveyer 3. Specifically, the bottle can 1 is comprised of a metal can trunk 4, and a disk-shaped bottom lid 5 attached to one end (i.e., an upper end in FIG. 1) of the can trunk 4. The bottom lid 5 is comprised of a flange portion 6 formed on an outer circumference thereof, and the bottom lid 5 is fixed to the can trunk 4 by seaming the flange portion 6 with an open end of the can trunk 4. Accordingly, the portion at which the flange portion 6 is seamed with the can trunk 4 corresponds to the seamed portion of the present invention. The bottom lid 5 is further comprised of an annular groove 7 called a counter sink formed in an inner circumferential side of the flange portion 6, and a panel portion 10 is formed within an inner circumferential side of the annular groove 7. That is, a circumferential outer edge 9 (protruding toward the bottom side of the bottle can 1) of the panel portion 10 is connected with an inclined inner wall 8 of the annular groove 7. In addition, the panel portion 10 is domically depressed. This means that the internal pressure of the bottle can 1 is negative, that is, lower than the atmospheric pressure. Meanwhile, a threaded neck portion 11 is formed on the other end of the can trunk 4 (i.e., on the lower end in FIG. 1), and a cap 2 is screwed on the neck portion 11.

For example, a belt conveyer can be used as the conveyer 3, and the bottle cans 1 are conveyed continuously in the inverted manner. The transportation speed of the conveyer 3 may be changed arbitrarily, and in this preferred example, the transportation speed is set around 70 m/min. Although not especially shown, in order to detect a transporting speed and a location of the bottle can 1 on the conveyer 3, a rotary encoder is attached to any of a driving roller, a driven roller and a driving motor shaft of the conveyer 3. Therefore, the bottle can 1 can be identified on the conveyer 3 based on the detected locational information.

A laser type displacement sensor (as will be simply called a "displacement sensor") 13 is situated above a bottle can 1 being conveyed on the conveyer 3 in the inverted manner in a plane parallel to the bottom lid 5. Specifically, as the conventional displacement sensors, the displacement sensor 13 is adapted to measure a distance between the displacement sensor 13 and the bottom lid 5 by irradiating the bottom lid 5 of the bottle can 1 being transported on the conveyer 3 with a laser beam, and receiving a reflected beam. To this end, a diameter of an irradiated area of the laser beam, that is, a spot diameter is adjusted to approximately 30 μm. The displacement sensor 13 is adapted to irradiate the bottom lid 5 with the laser beam repeatedly at extremely short intervals so that a position of the bottle can 1 or the distance therebetween is detected contiguously at a plurality of spots (or points) on the bottom lid 5. That is, the displacement sensor 13 is adapted to emit a laser pulse, and a pulse interval is set to irradiate the bottom lid 5 with the laser beam more than 700 times while the bottle can 1 is conveyed underneath the displacement sensor 13. In addition, a position of the displacement sensor 13 is adjusted to irradiate the bottom lid 5 with the laser beam along the diametrical line, that is, a center line of the bottom lid 5 of the bottle cans 1 passing underneath thereof.

In order to detect a fact that the bottle can 1 has reached an inspection starting position, according to the preferred example shown in FIG. 1, a photoelectric sensor 14 is situated beside the conveyer 3 at the inspection starting position and at a level within a length of the can trunk 4. The photoelectric sensor 14 is adapted to detect the bottle can 1 without contacting, that is, by irradiating the bottle can 1 with a beam. Therefore, the photoelectric sensor 14 detects with a fact that the bottle can 1 reaches the inspection starting position to inspect the internal pressure when the bottle can 1 blocks the beam emitted therefrom, and outputs a detection signal. Specifically, a position of the above-explained displacement sensor 13 is adjusted to irradiate a front end or slightly anteriorly of the seamed portion of the bottle can 1 situated at a position where the can trunk 4 blocks the beam emitted from the photoelectric sensor 14. That is, the displacement sensor 13 is allowed to start measuring a distance between the displacement sensor 13 and the bottom lid 5 from the front end of the seamed portion in the conveying direction, when the photoelectric sensor 14 detects the bottle can 1. In addition, according to the preferred example, a position of the bottle can 1 on the conveyer 3 can be specified not only based on the detection signal of the photoelectric sensor 14 but also based on the detection signal of the rotary encoder.

The rotary encoder, the displacement sensor 13 and the photoelectric sensor 14 are connected to a controller 15. The controller 15 is composed mainly of a microcomputer that is configured to output control signals to the rotary encoder, the displacement sensor 13 and the photoelectric sensor 14. In order to determine acceptability of the internal pressure of the bottle can 1, and to specify the unacceptable bottle can 1, the controller 15 carries out predetermined calculation based of the detection signals from those sensors. The internal pressure inspection method according to the present invention will be explained hereinafter.

As described, the bottle cans 1 to be inspected are erected on the conveyer 3 in the inverted manner while keeping predetermined intervals as shown in FIG. 1. When the predetermined bottle can 1 being conveyed on the conveyer 3 reaches the inspection starting position where the photoelectric sensor 14 is situated therebeside, a detection signal of a distance between the displacement sensor 13 and the bottom lid 5 is transmitted to the controller 15. In this situation, the bottle can 1 being inspected is conveyed at a constant speed, and the displacement sensor 13 measures the distance between the displacement sensor 13 and the bottom lid 5 at a plurality of points (more than 700 points) by emitting the laser pulses intermittently to the bottom lid 5. Then, the controller 15 individually calculates a deviation between: the distance between the displacement sensor 13 and a predetermined reference point, and each distance between the displacement sensor 13 and other points (i.e., a relative displacement value). Further, the controller 15 integrates the calculation values of the deviations between those distances. Accordingly, an integration function of the controller 15 serves as the displacement value integration means of the present invention.

Specifically, the panel portion 10 is deformed from the aforementioned outer edge 9. According to the preferred example, therefore, the outer edge 9 serves as the reference point, and a distance between the displacement sensor 13 and the outer edge 9 is employed as a reference distance. That is, the controller 15 integrates the deviations between the reference distance and each distance between the displacement sensor 13 and other measured points closer to the center of the panel portion 10. For example, the controller 15 may be configured to determine a fact that the reference point reaches the inspection starting position based on an elapsed time. In this case, a necessary time from a point when the front end of the can trunk 4 blocks the beam emitted from the photoelectric sensor 14 so that the photoelectric sensor 14 outputs a detection signal, to a point when the outer edge 9 is detected by the displacement sensor 13 is preinstalled in the controller 15. Therefore, the controller 15 is allowed to determine the fact that the reference point, that is, the outer edge 9 reaches the inspection starting position based on a fact that the measured time has elapsed. Alternatively, it is also possible to determine the fact that the reference point reaches the inspection starting position simply based on the distance between the displacement sensor 13 and the bottom lid 5. Specifically, the distance between the displacement sensor 13 and the bottom lid 5 is longest at a bottom of the annular groove 7, and shortest at a boundary between the annular groove 7 and the panel portion 10. In this case, therefore, the controller 15 is allowed to determine the fact that the reference point reaches the inspection starting position based on a fact that the distance between the displacement sensor 13 and the bottom lid 5 becomes shortest.

The inspection may be terminated based on a fact that a time calculated based on a diameter of the panel portion 10 and the speed of the conveyer 3 has elapsed. Alternatively, the inspection may also be terminated based on a fact that distance between the displacement sensor 13 and the bottom lid 5 becomes shortest at the other side of the panel portion 10.

Figure 2:
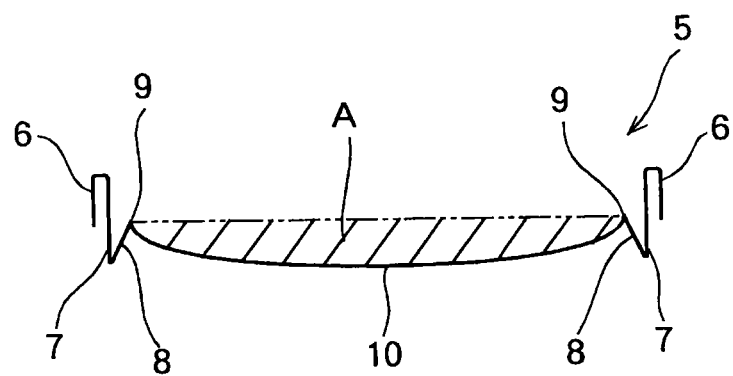
FIG. 2 is a cross-sectional view showing an integral or area calculated by the present invention.

As described, the distance between the displacement sensor 13 and the bottom lid 5 is measured at a plurality of points along the diametrical line of the bottom lid 5. Therefore, the integrated value of the deviations between the reference distance and the each distance measured at the other points represents a shadowed area A shown in FIG. 2 that is enclosed by a line connecting the diametrically opposed outer edges 9 and an arcuate contour of the panel portion 10 depressed inwardly. If the area A thus calculated falls within a predetermined range, the controller 15 determines that the internal pressure of the bottle can 1 is normal. However, if the bottle can 1 has a pinhole, or if gas is produced due to deterioration of the content, the internal pressure of the bottle can 1 would be changed thereby changing the area A. As a result, if the calculation value of the area A exceeds or falls below the predetermined range, the controller 15 determines that the internal pressure of the bottle can 1 is unacceptable.

Thus, according to the present invention, the controller 15 is configured to judge the acceptability of the internal pressure of the bottle can 1 by comparing the calculated value of the area A with an upper limit value and a lower limit value of the above-explained acceptable rage. Accordingly, the function of the controller 15 to judge the acceptability of the internal pressure of the bottle can 1 serves as the judging means of the present invention. A position of the unacceptable bottle can 1 on the conveyor 3 is specified by the rotary encoder of the conveyor 3, and removed from the conveyor 3 by a removing device (not shown) in the downstream side.

Figure 3:
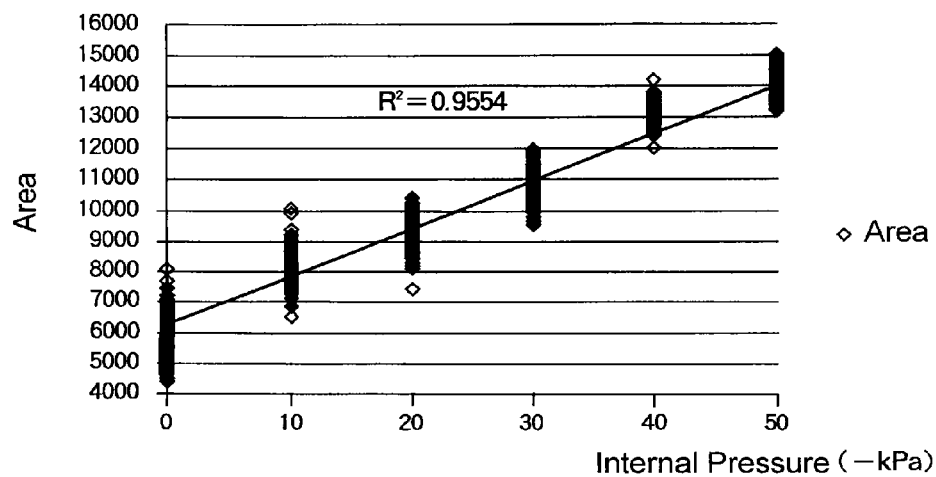
FIG. 3(a) is a graph indicating the area data and a measurement result of the internal pressure, and Fig. (b) is a graph indicating a relation between the displacement data and the internal pressure measured by the laser sensor.
Figure 3:
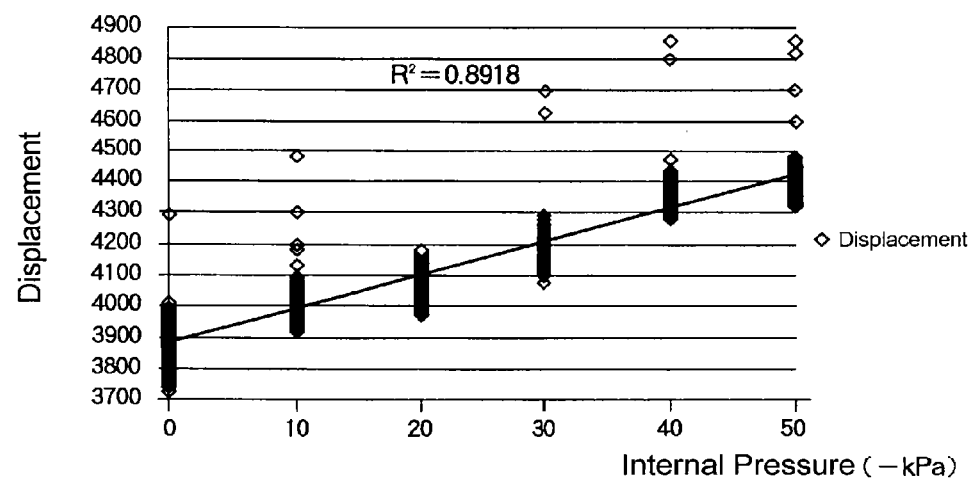

Referring now to FIG. 3, there is shown a relation between the area A and the internal pressure of the bottle can 1. FIG. 3(a) shows measurement results of the area A measured while reducing the internal pressure by 10 kPa from 0 kPa. In FIG. 3(a), "$R^2$" represents a probability distribution. As can be seen from FIG. 3(a), the area A and the internal pressure are strongly related to each other.

Meanwhile, FIG. 3(b) shows measurement results of the distances between the laser displacement sensor and the panel portion 10 measured at a plurality of points from the seamed portion as the reference point, and at different internal pressures. As indicated by the probability distribution "$R^2$", the displacement data shown in FIG. 3(b) tends to deviate toward larger values and variation of measured values is wider than that of the data shown in FIG. 3(a). This means that the relation between the displacement data and the internal pressure is not so strong. Therefore, the accuracy to judge the acceptability of the internal pressure may be insufficient in this case.

Thus, the integral or accumulation value of the deformation of the bottom lid and the internal pressure of the container shows a strong correlation with each other. Therefore, according to the present invention, the integral or accumulation value is compared with the predetermined reference value to judge the acceptability of the internal pressure of the container. According to the present invention, specifically, deformations at a plurality of points are integrated or accumulated. Therefore, even if the deformation of the can lid is small at the individual point, a total deformation value of the can lid would be large so that the total deformation and the acceptability of the internal pressure of the container can be judged accurately. In addition, since the deformation value of the can lid is measured using the laser beam of a small spot diameter, the deformations of the can lid and the acceptability of the internal pressure of the container can be judged accurately. Further, according to the present invention, the measurement of the bottom lid is started from the outer circumferential edge 9 as the reference point, that is, the closest position to the displacement sensor. Therefore, even if the container is inclined, a measurement error resulting from the inclination of the container can be reduced. Furthermore, since the internal pressure is inspected by calculating the data detected by the displacement sensor, the structure of the apparatus can be simplified so that it is easy to apply the apparatus to the existing facilities.

The present invention should not be limited to the foregoing preferred example. For example, can containers other than the bottle can such as synthetic resin containers may be inspected. In addition, not only the negative pressure containers deformed inwardly by the internal pressure but also the positive pressure containers deformed outwardly by the internal pressure may be inspected. In case of inspecting the positive pressure containers, the center portion of the can lid is the most expanded portion. In this case, therefore, the inspection will be started from the furthest edge from the displacement sensor. Further, according to the present invention, the measurement of the can lid is carried out by relatively moving the displacement sensor and the container to be inspected. Therefore, the container may also be inspected by fixing the container while moving the displacement sensor. Lastly, the reference point to start the measurement of the can lid may be changed from the outer edge 9 arbitrarily according to need.

The invention claimed is:
1. An internal pressure inspection apparatus for a sealed container having a can lid that is attached to any of an upper end and a lower end of a can trunk, and that is deformed by an internal pressure of the container, comprising:
   a laser displacement sensor that measures a distance from a plurality of spots on a diametrical line of the can lid in a conveyance direction of the sealed container by irradiating the can lid of the sealed container with the laser beam continuously; and a controller that judges acceptability of the internal pressure of the sealed container based on the distance measured by the laser displacement sensor;

wherein the controller is configured to:

calculate a relative displacement value of the can lid by calculating a deviation between: a distance between the laser displacement sensor and a predetermined reference point; and each distance between the laser displacement sensor and other points;

calculate an integral value of the relative displacement values;

determine a fact that the internal pressure of the sealed container is acceptable if the integral value falls within a predetermined acceptable range between an upper limit value and a lower limit value; and determine a fact that the internal pressure of the sealed container is unacceptable if the integral value falls out of the acceptable range.

2. The internal pressure inspection apparatus for a sealed container as claimed in claim 1, wherein the can lid includes an annular groove formed by inwardly depressing in an inner circumferential side of the seamed portion, an outer edge connected with an inclined inner wall of the annular groove, and a panel portion formed within an inner circumferential side of the outer edge;

wherein the reference point is the outer edge; and wherein the other points are a plurality of points on the panel portion.

3. The internal pressure inspection apparatus for a sealed container as claimed in claim 1, wherein a total number of the reference point and the other points is 700 or larger.

4. The internal pressure inspection apparatus for a sealed container as claimed in claim 1, wherein a total number of the reference point and the other points is 700 or larger.

5. An internal pressure inspection method for a sealed container having a can lid that is attached to any of an upper end and a lower end of a can trunk, and that is deformed by an internal pressure of the container, comprising:

conveying a sealed container unidirectionally;

measuring a distance from a plurality of spots on a diametrical line of the can lid in a conveyance direction of the sealed container by irradiating the can lid of the sealed container with the laser beam continuously;

calculating a relative displacement value of the can lid by calculating a deviation between: a distance between the laser displacement sensor and a predetermined reference point; and each distance between the laser displacement sensor and other points;

calculating an integral value of the relative displacement values;

determining a fact that the internal pressure of the sealed container is acceptable if the integral value falls within a predetermined acceptable range between an upper limit value and a lower limit value; and determining a fact that the internal pressure of the sealed container is unacceptable if the integral value falls out of the acceptable range.

6. The internal pressure inspection method for a sealed container as claimed in claim 5, wherein the can lid is comprised of an annular groove formed by inwardly depressing in an inner circumferential side of the seamed portion, an outer edge connected with an inclined inner wall of the annular groove, and a panel portion formed within an inner circumferential side of the outer edge;

wherein the relative displacement values include displacement values of a plurality of points on the panel portion in comparison with the outer edge.

7. The internal pressure inspection method for a sealed container as claimed in claim 6, wherein the relative displacement values are measured at 700 points or larger.

8. The internal pressure inspection method for a sealed container as claimed in claim 5, wherein the can lid is comprised of an annular groove formed by inwardly depressing in an inner circumferential side of the seamed portion, an outer edge connected with an inclined inner wall of the annular groove, and a panel portion formed within an inner circumferential side of the outer edge;

wherein the relative displacement values include displacement values of a plurality of points on the panel portion in comparison with the outer edge.

9. The internal pressure inspection method for a sealed container as claimed in claim 8, wherein the relative displacement values are measured at 700 points or larger.

10. The internal pressure inspection method for a sealed container as claimed in claim 5, wherein the relative displacement values are measured at 700 points or larger.

11. The internal pressure inspection method for a sealed container as claimed in claim 5, wherein the relative displacement values are measured at 700 points or larger.

* * * * *